Figure 1:
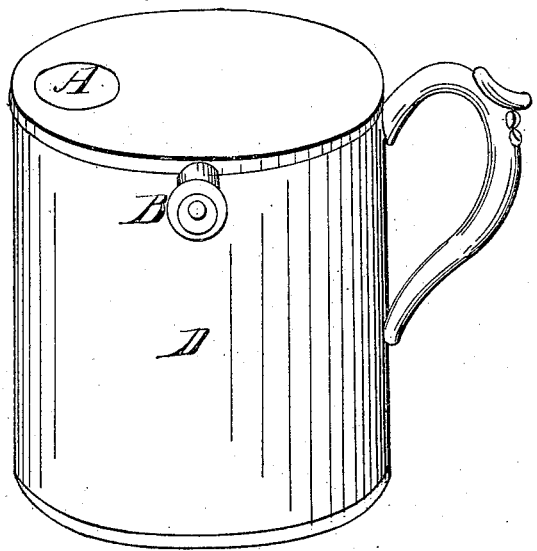
Figure 1:
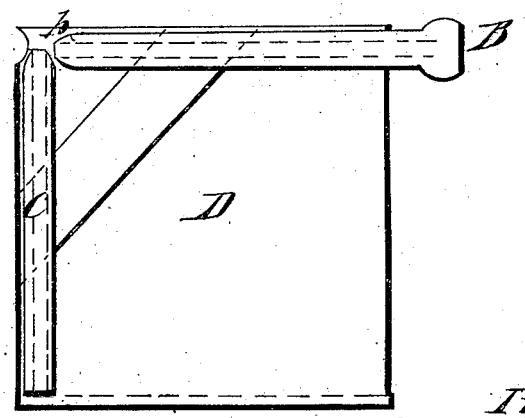

H. Kraut,

Atomizer,

N° 79,764. Patented July 7, 1868.

Witnesses:
G. Hartman
H. Schoettler

Inventor:
Henry Kraut

United States Patent Office.

HENRY KRAUT, OF ST. LOUIS, MISSOURI.

Letters Patent No. 79,764, dated July 7, 1868.

IMPROVED APPARATUS FOR ATOMIZING LIQUIDS.

*The Schedule referred to in these Letters Patent and making part of the same.*

TO ALL WHOM IT MAY CONCERN:

Be it known that I, HENRY KRAUT, of the city and county of St. Louis, State of Missouri, have invented a new and improved Apparatus for the Purpose of Vaporizing Fluids by means of a current of air passing through a thin and subtle stream or current of the fluid.

My apparatus, which I call an "atomizer," consists of the following parts, reference being had to the accompanying drawings, and to the letters of reference marked thereon.

Inside of a metal vessel, D, two tubes, B and C, are arranged in such a manner that the pointed and pierced ends $b$ and $c$ meet under right angles.

The metal tube B is the air-tube. By forcing a current of air through this tube and across the small opening $c$ on top of the vertical sucking-tube C, the fluid is sucked up into the latter, leaves it at $c$, and is blown into the air in a vaporous form through the hole E. A is a hole through which the fluid is poured into the vessel.

The atomizer may be used for disinfecting rooms, moistening the atmosphere, sprinkling clothes, carpets, flowers, &c., with a fine shower.

Now, be it known that I do not claim the peculiar arrangement of the tubes to each other for the mentioned purpose, which I believe has been known long since; but

What I claim as my invention, and desire to secure by Letters Patent, is—

The arrangement of the tubes B and C inside of the vessel D, so as to be protected from all external influences.

HENRY KRAUT.

Witnesses:
FERDINAND LINGEAR,
CHARLES T. MILLER.